US006415610B1

(12) United States Patent
Parker

(10) Patent No.: US 6,415,610 B1
(45) Date of Patent: Jul. 9, 2002

(54) APPARATUS AND METHOD FOR REPLACEMENT OF COMBUSTOR BASKET SWIRLERS

(75) Inventor: David Marchant Parker, Oviedo, FL (US)

(73) Assignee: Siemens Westinghouse Power Corporation

( * ) Notice: Subject to any disclaimer, the term of this patent is extended or adjusted under 35 U.S.C. 154(b) by 0 days.

(21) Appl. No.: 09/642,462

(22) Filed: Aug. 18, 2000

(51) Int. Cl.[7] .............................. F23R 3/14; F02C 7/22

(52) U.S. Cl. .......................................... 60/798; 60/748

(58) Field of Search ............................ 60/39.31, 39.32, 60/748, 798, 799, 800

(56) References Cited

U.S. PATENT DOCUMENTS

| | | | | | |
|---|---|---|---|---|---|
| 2,752,753 A | * | 7/1956 | Dooley | | 60/748 |
| 3,027,715 A | * | 4/1962 | Morris | | 60/39.32 |
| 4,044,553 A | * | 8/1977 | Vaught | | 60/748 |
| 4,216,652 A | * | 8/1980 | Herman et al. | | 60/748 |
| 4,262,486 A | * | 4/1981 | Russell | | 60/746 |
| 4,825,641 A | * | 5/1989 | Mandet et al. | | 60/748 |
| 5,014,918 A | * | 5/1991 | Halvorsen | | 239/410 |
| 5,117,637 A | | 6/1992 | Howell et al. | | |
| 5,321,951 A | * | 6/1994 | Falls et al. | | 60/748 |
| 5,331,815 A | * | 7/1994 | Reinhold, Jr. et al. | | 60/748 |
| 5,373,693 A | | 12/1994 | Zarzalis et al. | | |
| 5,465,571 A | | 11/1995 | Clark | | |
| 5,564,271 A | | 10/1996 | Butler et al. | | |
| 5,671,597 A | | 9/1997 | Butler et al. | | |

* cited by examiner

*Primary Examiner*—Ted Kim

(57) ABSTRACT

A support member for removably supporting a swirler on a basket frame of a combustion gas turbine engine includes a plug removably mounted on the basket frame and a pin fixedly mounted on the swirler. A mechanical lock detachably connects the plug and the pin with one another, and the mechanical lock may include cooperating threads or other appropriate structures. The swirler is removed from the basket frame by detaching the plug from the basket frame, disconnecting the plug from the pin, and sliding the swirler longitudinally along its own axis whereby the pin clears the mounting hole within which the plug was mounted.

9 Claims, 4 Drawing Sheets

APPARATUS AND METHOD FOR REPLACEMENT OF COMBUSTOR BASKET SWIRLERS

BACKGROUND OF THE INVENTION

1. Technical Field

The present invention relates generally to combustion gas turbine engines and, more particularly, to a support member for supporting a swirler in a basket frame of a combustion gas turbine engine. Specifically, the invention relates to a two-piece support member that removably mounts a swirler to a combustor basket frame of a gas turbine engine.

2. Description of the Related Art

As is known in the relevant art, combustion gas turbine engines typically include a compressor section, a combustor section, and a turbine section. Large quantities of air are compressed in the compressor section and are delivered to a large pressurized plenum in the combustor section. The compressed air travels from the pressurized plenum into and through a plurality of swirlers where the air is mixed with fuel. The fuel/air mixture thereafter travels into a plurality of combustor baskets where the fuel/air mixture is combusted. The combustion gases flow through the combustor baskets and into the turbine section where the combustion gases power a turbine and thereafter exit the engine. In its simplest form, the turbine section includes a shaft that drives the compressor section, and the energy of the combustion gases is greater than that required to run the compressor section. As such, the excess energy is taken directly from the turbine/compressor shaft or may be employed in the form of thrust, depending upon the specific application and the nature of the engine.

Within the combustor section, the swirlers are circumferentially distributed within and mounted on a basket frame. More specifically, the basket frame is a substantially annular member formed with a plurality of mounting holes. Each swirler is mounted on the basket frame with a pair of support shanks extending between the swirler and the basket frame. The support shanks extend through the mounting holes and are welded to an outer surface of the basket frame.

While the practice of mounting the swirlers on the basket frame with support shanks extending therebetween has been generally effective for the intended purpose, such practice has not, however, been without limitation. As is known in the relevant art, combustion gas turbine engines operate at elevated temperatures and pressures and involve the high speed rotation of substantial components thereof. As such, the swirlers of such engines are subjected to extreme thermal and mechanical stresses.

As a result, one or more swirlers often become in need of repair or replacement, and such repair or replacement typically is conducted during routine maintenance of the engine. In order to maximize performance of the engine, however, the swirlers are configured in a tight side-by-side arrangement along the inner circumference of the basket frame (FIG. 1). As such, any single swirler cannot be individually removed because the support shanks that extend between the swirler and the basket frame and that are received in the mounting holes interfere with any attempted removal of the swirler along the longitudinal axis of the swirler. Moreover, the swirler cannot be removed from the basket frame in a direction radially inward toward the central axis of the basket frame inasmuch as the other swirlers that are mounted along the inner circumference of the basket frame interfere with such movement. While the swirlers are assembled in such a close fashion during manufacture of the engine by carefully controlling the assembly process, the removal of a single swirler has heretofore been impossible without removing a substantial number of other components, particularly other swirlers, from the basket frame. As such, it is desired to provide an improved support member for mounting a swirler to a basket frame of a gas turbine engine and a method of removably mounting the swirler to the basket frame. The method preferably can be retrofitted into existing engines as well as implemented into new engines during the manufacture thereof.

SUMMARY OF THE INVENTION

In view of the foregoing, a support member for removably supporting a swirler on a basket frame of a combustion gas turbine engine includes a plug removably mounted on the basket frame and a pin fixedly mounted on the swirler. A mechanical lock detachably connects the plug and the pin with one another, and the mechanical lock may include cooperating threads or other appropriate attachment structures. The swirler is removed from the basket frame by detaching the plug from the basket frame, disconnecting the plug from the pin, and sliding the swirler longitudinally along its own axis whereby the pin clears the mounting hole within which the plug was mounted.

An aspect of the present invention is to provide a support member for mounting a swirler to a basket frame within a gas turbine engine, the general nature of which can be stated as including a first member being of a first length and being structured to be removably mounted on the basket frame, a second member being of a second length and being structured to be fixedly mounted on the swirler, and a mechanical lock extending between the first and second members and detachably connecting the first and second members with one another, the first and second members together being of a third length when the mechanical lock connects the first and second members.

Another aspect of the present invention is to provide a gas turbine engine, the general nature of which can be stated as including a compressor section, a combustor section, a turbine section, the combustor section including a basket frame, at least a first swirler, and at least a first support member, the at least first support member including a first member, a second member, and a mechanical lock, the first member being of a first length and being removably mounted on the basket frame, the second member being of a second length and being fixedly mounted on the at least first swirler, and the mechanical lock extending between the first and second members and detachably connecting the first and second members with one another, the first and second members together being of a third length when the mechanical lock connects the first and second members with one another, the third length being greater than the second length.

Still another aspect of the present invention is to provide a method of removably mounting a swirler onto a basket frame in the combustor section of a gas turbine engine, the general nature of which can be stated as including the steps of providing a pin extending from the swirler, removably connecting the pin to a plug, and removably attaching the plug to the basket frame.

BRIEF DESCRIPTION OF THE DRAWINGS

The preferred embodiment of the invention, illustrative of the best mode in which Applicant has contemplated of applying the principles of the invention, is set forth in the following description and is shown in the drawings and is particularly and distinctly pointed out and set forth in the appended Claims.

Similar numerals referred to similar parts throughout the specification.

DESCRIPTION OF THE PREFERRED EMBODIMENT

Figure 1:
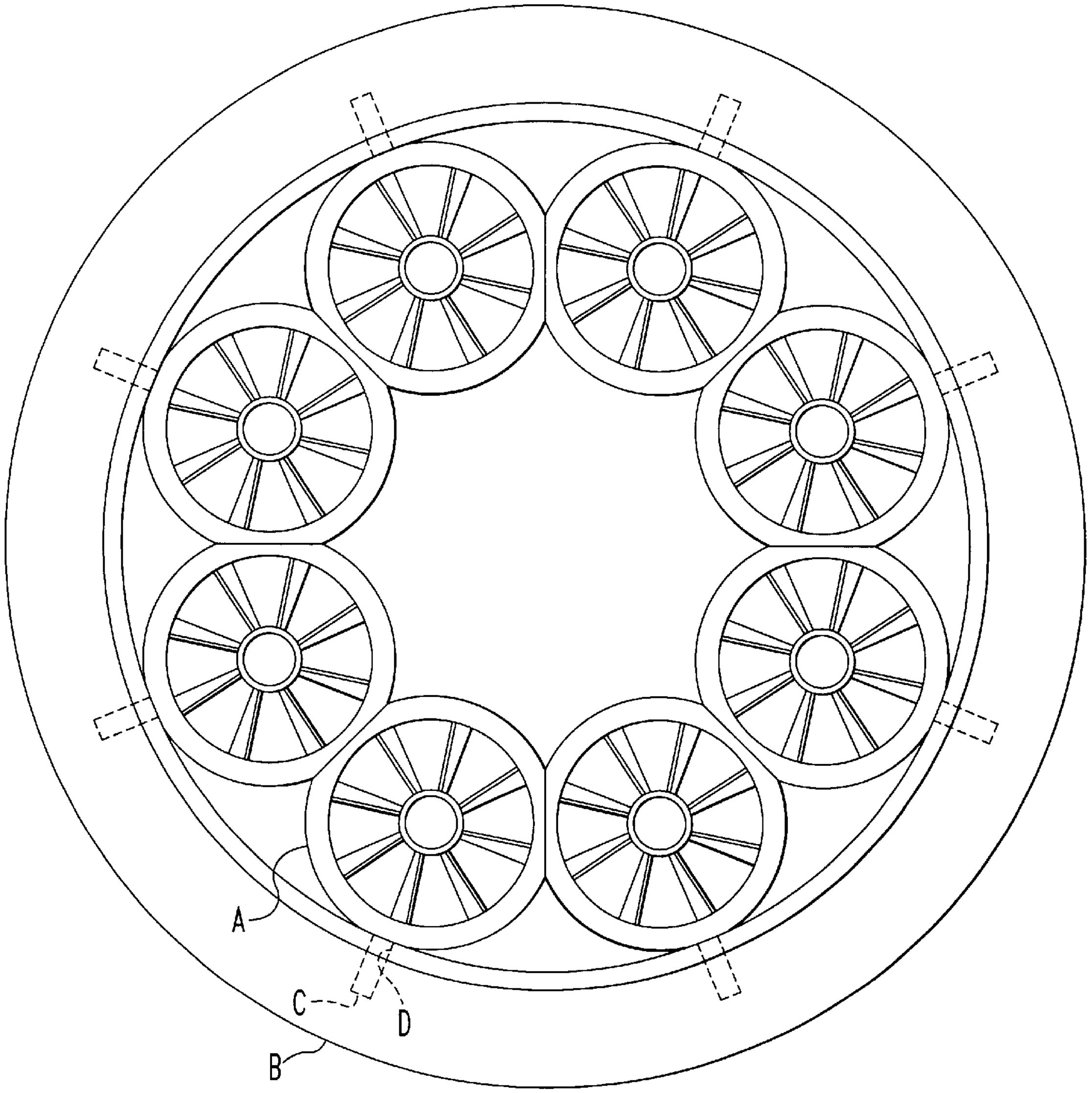
FIG.1 PRIOR ART
FIG. 1 is a prior art end view of a basket frame to which a plurality of swirlers are mounted.
Figure 2:
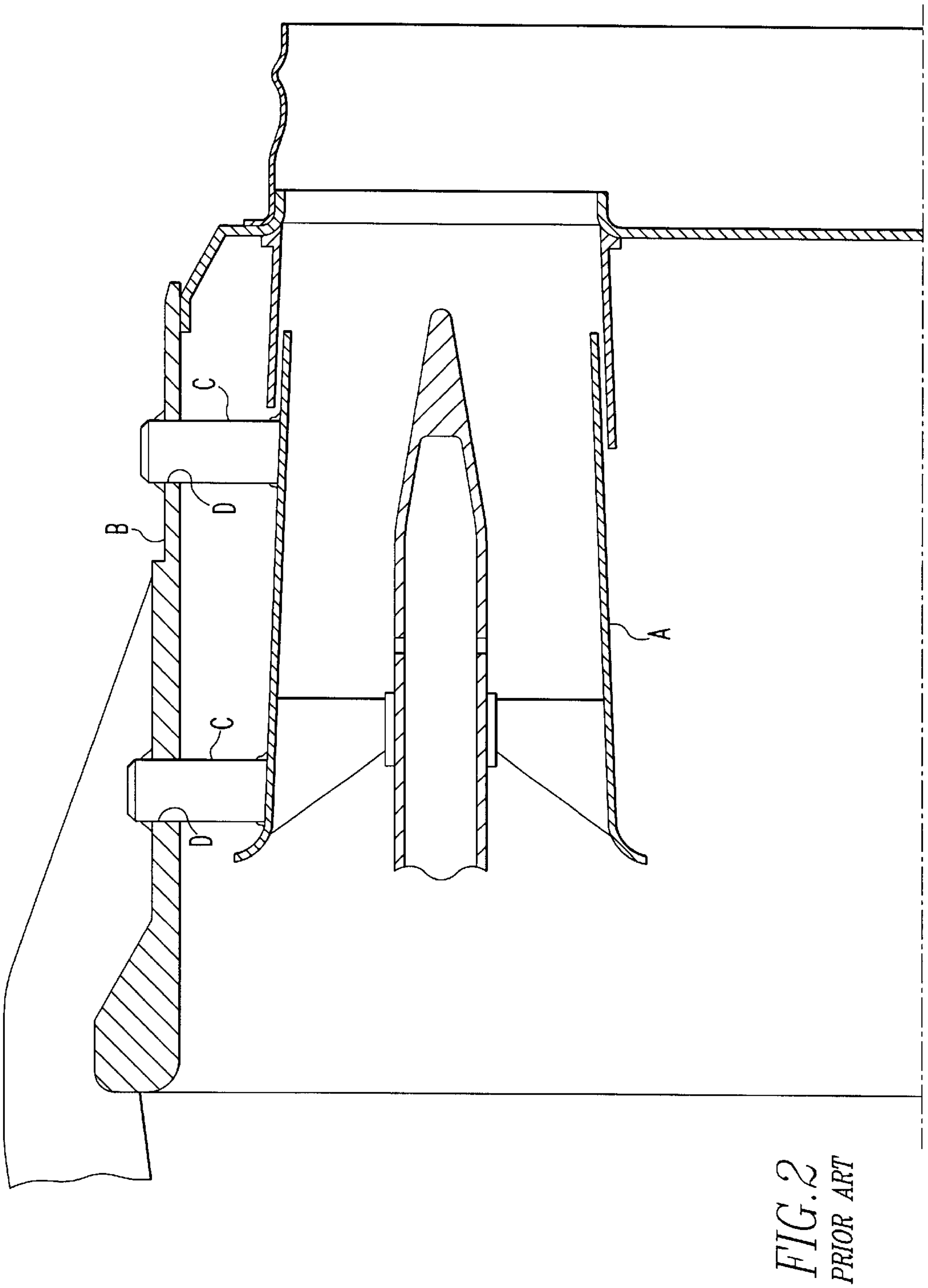
FIG. 2 PRIOR ART
FIG. 2 is a prior art side view, partially cut away, of a single swirler mounted on a basket frame.

As is best shown in FIGS. 1 and 2, which are prior art views, a plurality of swirlers A are mounted on the inner circumference of an annular basket frame B. Each swirler A is mounted on the basket frame B with a pair of support shanks C that extend between the swirler A and basket frame B and are received in mounting holes D formed in the basket frame B.

As is best shown in FIG. 1, the swirlers A are disposed closely adjacent one another such that any individual swirler A, if in need of replacement, could not be moved radially inward toward the center axis of the basket frame B due to interference between it and the other swirlers A. Moreover, many basket frames B additionally include a pilot swirler that is disposed along the center axis of the basket frame and that would provide a further impediment to radial removal of an individual swirler.

As can been seen in FIG. 2, inasmuch as the support shanks C extend through the mounting holes D in the basket frame B, the given swirler A additionally cannot be moved along its own longitudinal axis in a direction parallel with the central axis of the basket frame B due to interference between the support shanks C and the mounting holes D. The given swirler A thus cannot be removed without additionally removing a substantial number of other swirlers A.

Figure 3:
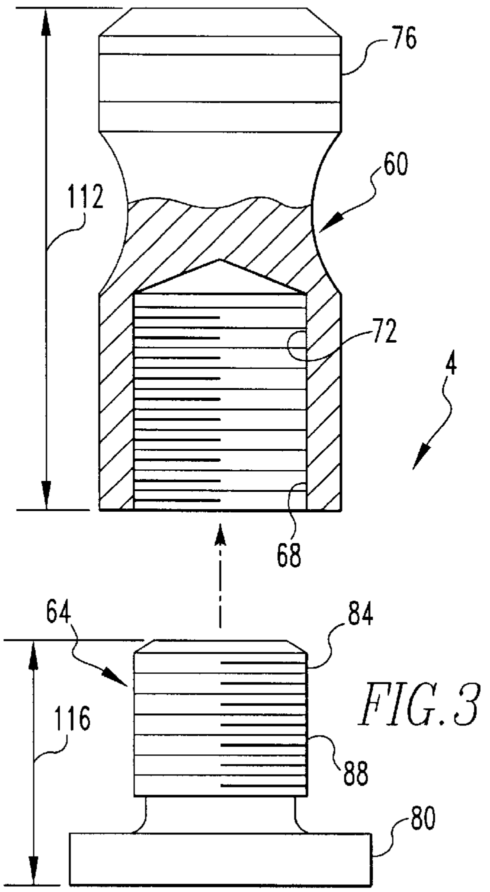
FIG. 3 is an exploded front elevational view, partially cut away, of a support member in accordance with the present invention.
Figure 3A:
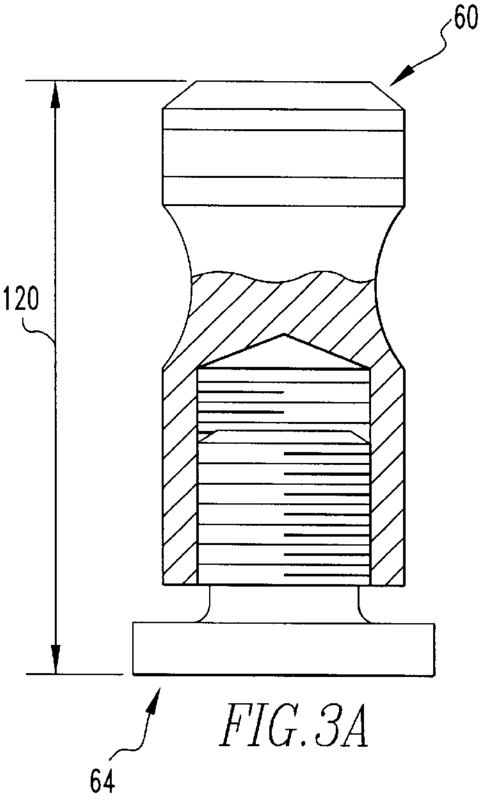
FIG. 3A is a view similar to FIG. 3, except depicting the support member in an unexploded condition.
Figure 5:
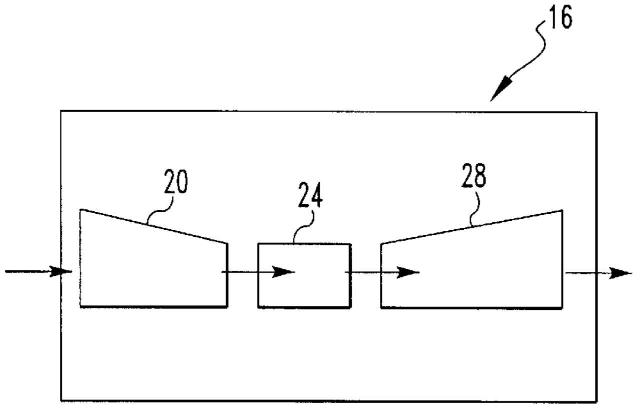
FIG. 5 is a schematic view of a combustion gas turbine engine employing the support member.
Figure 4:
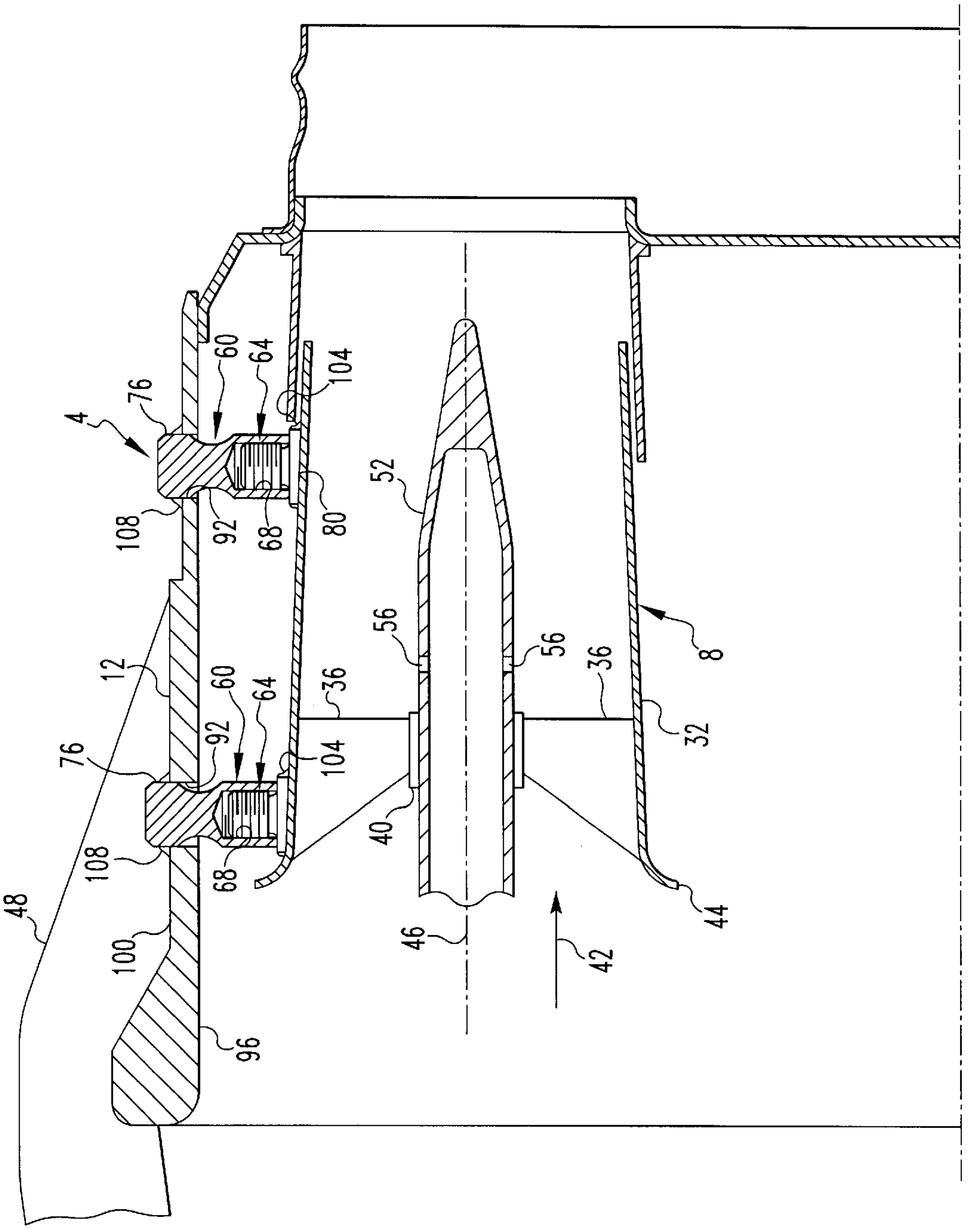
FIG. 4 is a side elevational view, partially cut away, of the support member detachably mounting a swirler to a basket frame.

The support member of the present invention that advantageously overcomes the aforementioned problem is indicated generally at the numeral 4 in FIGS. 3 and 4. The support number 4 is employed to removably mount a swirler 8 to a basket frame 12 of a combustion gas turbine engine 16 (FIG. 5). The support member 4 advantageously can both be retrofitted into existing engines 16 during periodic maintenance or at other appropriate times and implemented into new engines 16 during the manufacture thereof.

As is known in the relevant art, the combustion gas turbine engine 16 includes a compressor section 20, a combustor section 24, and a turbine section 28. Large quantities of air serially flow through the compressor section 20, the combustor section 24, and the turbine section 28, as is illustrated schematically by the arrows in FIG. 5.

The combustor section 24 includes a plurality of the swirlers 8 mounted on each basket frame 12. As is known in the relevant art, the air traveling through the engine 16 flows through the swirlers 8 where it is mixed with fuel and delivered to a combustor basket (not shown) where the fuel/air mixture is combusted.

More specifically, in the particular embodiment shown, each swirler 8 includes a canister 32, a plurality of fins 36, and a retention ring 40. It is understood, however, that the teachings of the present invention are equally applicable to swirlers having configurations other than that shown herein.

The canister 32 is a hollow member of annular cross section that is tapered inward in a downstream air flow direction represented by the arrow 42. The canister 32 includes a flared upstream end 44 that flares radially outwardly from the longitudinal axis of the canister 32. As is best shown in FIG. 1, the flared upstream ends of the swirlers are undercut or shaved slightly at two areas along the circumference thereof to provide a pair of flats. The flats permit the swirlers to be positioned more closely adjacent one another, as is indicated generally in FIG. 1.

Each swirler 8, as depicted herein, includes eight fins 36 extending radially between the retention ring 40 and the canister 32. The fins 36 are each curved or angled slightly with respect to a longitudinal axis 46 of the swirler 8 to promote turbulence or, more accurately "swirl," in the air flowing through the swirler 8 and to promote the intermixing of fuel with the air.

As can be seen in FIG. 4, a frame member 48 is connected with the basket frame 12 and extends therefrom in a direction generally opposite the airflow direction 42. The frame member 48 helps to carry a fuel injection system that includes an injector 52 that is received in the retention ring 40. The retention ring 40 is an annular member that is sized to receive the injector 52 therein with minimal play. The injector 52 is formed with a plurality of holes 56 that are evenly circumferentially distributed about the injector 52 and that deliver fuel to the air flowing through the swirler 8.

In the particular embodiment depicted herein, two of the support members 4 extend between each swirler 8 and the basket frame 12 to removably mount the swirler 8 thereto. It is understood, however, that in other embodiments or applications, each swirler 8 may employ a greater or lesser number of the support members 4 as appropriate.

As is best shown in FIG. 3, the support member 4 includes a plug 60 and a pin 64. The plug 60 is an elongated member of substantially circular cross section and is formed with a substantially cylindrical cavity 68 that is coaxially aligned therewith. A plurality of internal threads 72 are formed on the plug 60 within the cavity 68. The plug 60 terminates at a head 76 at an upper end thereof opposite the cavity 68.

The pin 64 includes a base 80 and a hub 84 connected with one another. The hub 84 is a substantially cylindrical member formed with a plurality of external threads 88. The external threads 88 cooperate threadably with the internal threads 72 formed on the plug 60.

The basket frame 12 is formed with a plurality of mounting holes 92 that are sized to at least partially receive the plug 60 therein. The basket frame 12 additionally includes an arcuate inner surface 96 and an arcuate outer surface 100 opposite one another.

Each of the swirlers 8, in the particular embodiment shown herein, is removably mounted on the basket frame 12 with two of the support members 4. Inasmuch as the process by which the swirlers 8 are removably mounted to the basket frame is substantially identical as to each of the support members 4, the mounting method described herein will discuss only to a single support member 4. It is understood, however, that each swirler 8, in the configuration depicted herein, is mounted on the basket frame 12 with a pair of the support members 4. It is further understood that in other embodiments each swirler 8 may be mounted with only a single support member 4, or still alternatively may be mounted with three or more support members 4, depending upon the specific needs of the particular application.

In removably mounting the swirler 8 to the basket frame 12, the pin 64 is fixedly mounted on the canister 32. While it is preferred that the pin 64 be mounted on the canister 32 by applying a first weld 104 between the outer surface of the canister 32 and the base 80, it is understood that other appropriate attachment methods maybe employed without departing from the present invention.

The swirler 8 is then translated in the direction of the longitudinal axis 46 into the interior of the basket frame 12 until the pin 64 is aligned with the mounting hole 92 formed in the basket frame 12. The plug 60 is then inserted through the mounting hole 92 from the outer surface 100, and the internal threads 72 are threadably engaged with the external threads 88 of the hub 84.

The internal end external threads 72 and 88 are tightened to a given torque with an appropriate tool. In this regard, it is understood that the head 76 can be formed with an attachment socket or with one or more flats that can be engaged by devices such as screwdriver bits, hex wrenches, socket wrenches and the like, although other tightening methods maybe employed without departing from the present invention. The plug 60 and pin 64 still alternatively my include connection structures other than the internal and external threads, such as bayonet mounting structures and the like.

Once the plug 60 and pin 64 are properly tightened with respect to one another, a second weld 108 is applied between the outer surface 100 of the basket frame 12 and the plug 60. While the second weld 108 is depicted as extending between the basket frame 12 and the head 76 of the plug 60, it is understood that the second weld 108 can extend between the basket frame 12 and virtually any part of the plug 60. It is further understood that alternate detachable attachment structures and methods may be employed to detachably mount the plug 60 to the basket frame 12 without departing from the present invention.

With the support member 4 attached to the swirler 8 with the first weld 104 and attached to the basket frame 12 with the second weld 108, it can be seen that the swirler 8 is securely retained in a desired position. It can also be seen that the swirlers 8 have been mounted on the basket frame 12 without altering the configuration of the swirlers 8 or the arrangement of the swirlers 8 within the basket frame 12.

The swirler 8 is removed from the basket frame 12 by cutting away the second weld 108, unthreading the plug 60 from the pin 64, and translating the swirler 8 out of the basket frame 12 in a direction along the longitudinal axis 46. From FIG. 4, it can be seen that with the plugs 60 disconnected from the pins 64, the pins 64 are not received in the mounting holes 92. In such a condition, there can be no inference between the pins 64 and the mounting holes 92 when the swirler 8 is withdrawn from the basket frame 12 in the direction of the longitudinal axis 46.

More particularly, and as can be seen in FIGS. 3–4, the plug 60 is of a first length denoted by the dimension line 112, and the pin 64 is of a second length denoted by the dimension line 116. When the plug 60 and pin 64 are threaded with one another, the support member 4 is of a third length that is denoted by the dimension line 120. The third length 120 is greater than either of the first and second lengths 112 and 116.

In this regard, it can be seen that the support member 4 is advantageously configured such that the second length 116 of the pin 64 is of a sufficiently low profile that the pin 64 by itself cannot be received in or interfere with the mounting holes 92. With pin 64 mechanical connected with the plug 60, however, the assembled support member 4 is configured such that the third length 120 is sufficient to extend from the canister 32 and be at least partially received in the mounting hole 92 where the second weld 108 can be applied between the outer surface 100 of the basket frame 12 and the head 76 of the plug 60. It can consequently be seen that after the plug 60 has been detached from the pin 64 during removal of the swirler 8 from the basket frame 12, the pin 64 is out of interference with the mounting holes 92, which permits the swirler 8 to be removed from the basket frame 12 along the longitudinal axis 46 of the swirler. After appropriate maintenance has been performed, the swirler 8 can be reinstalled in the basket frame 12 in the manner set forth above.

It can thus be seen that by configuring the support member 4 as a two-piece member with one piece being fixedly mounted on the swirler 8 and the other piece being removably mounted on the basket frame 12, the piece mounted on the swirler can be configured to not interfere with the mounting holes 92. Such a configuration permits the swirler 8 to be longitudinally removed from the basket frame 12 without requiring the disassembly or removal of any of the other swirlers 8 from the basket frame 12. Moreover, as indicated above, the support member 4 can be employed without altering the overall configuration of the basket frame 12 or of the engine 16, although the present invention also may be employed during the original manufacture of the engine 16.

While a particular embodiment of the present invention has been described herein, it is understood that various changes, additions, modifications, and adaptations maybe made without departing from the scope of the present invention, as set forth in the following Claims.

What is claimed is:

1. A support assembly for mounting a swirler to a combustor basket frame within a gas turbine engine, the support assembly comprising:

an elongated first member being of a first length and being structured to be removably mounted on the basket frame, said first member including a first set of threads;

an elongated second member being of a second length and being structured to be fixedly mounted on an outer surface of the swirler, said second member including a second set of threads; and wherein said second set of threads is adapted to threadably engage said first set of threads to form a mechanical lock extending between the first and second members and detachably connecting the first and second members with one another, the first and second members together being of a third length when the mechanical lock connects the first and second members, the third length being greater than the second length.

2. The support member as set forth in claim 1, in which one of the first and second members is formed with a cavity, and in which the other of the first and second members is at least partially received in the cavity when the first and second members are connected with one another by the mechanical lock.

3. A gas turbine engine comprising:

a compressor section;

a combustor section;

a turbine section;

the combustor section including a combustor basket frame, at least a first swirler, and at least a first support member;

the at least first support member including an elongated first member having a first set of threads, an elongated second member having a second set of threads, wherein said second set of threads is adapted to threadably engage said first set of threads to form a mechanical lock;

the first member being of a first length and being removably mounted on the basket frame;

the second member being of a second length and being fixedly mounted on an outer surface of the at least first swirler; and the mechanical lock extending between the first and second members and detachably connecting the first and second members with one another, the first and second members together being of a third length when the mechanical lock connects the first and second members with one another.

4. The engine as set forth in claim 3, in which one of the first and second members is formed with a cavity, and in which the other of the first and second members is at least partially received in the cavity when the first and second members are connected with one another by the mechanical lock.

5. The engine as set forth in claim 3, in which the basket frame includes an inner surface and an outer surface and is formed with at least a first mounting hole extending between the inner and outer surfaces, the first member being at least partially received in the at least first mounting hole.

6. The engine as set forth in claim 5, in which a weld extends between the first member and the outer surface of the basket frame.

7. The engine as set forth in claim 5, in which the at least first mounting hole is free of the second member.

8. The engine as set forth in claim 3, further comprising a second support member including a first member removably mounted on the basket frame, a second member fixedly mounted on the at least first swirler, and a mechanical lock extending between the first and second members of the second support member and detachably connecting the first and second members of the second support member with one another.

9. The engine as set forth in claim 3, in which the third length is greater than the second length.

* * * * *